No. 782,189. PATENTED FEB. 7, 1905.
W. O. CANOUTS.
BURIAL APPARATUS.
APPLICATION FILED FEB. 23, 1904.

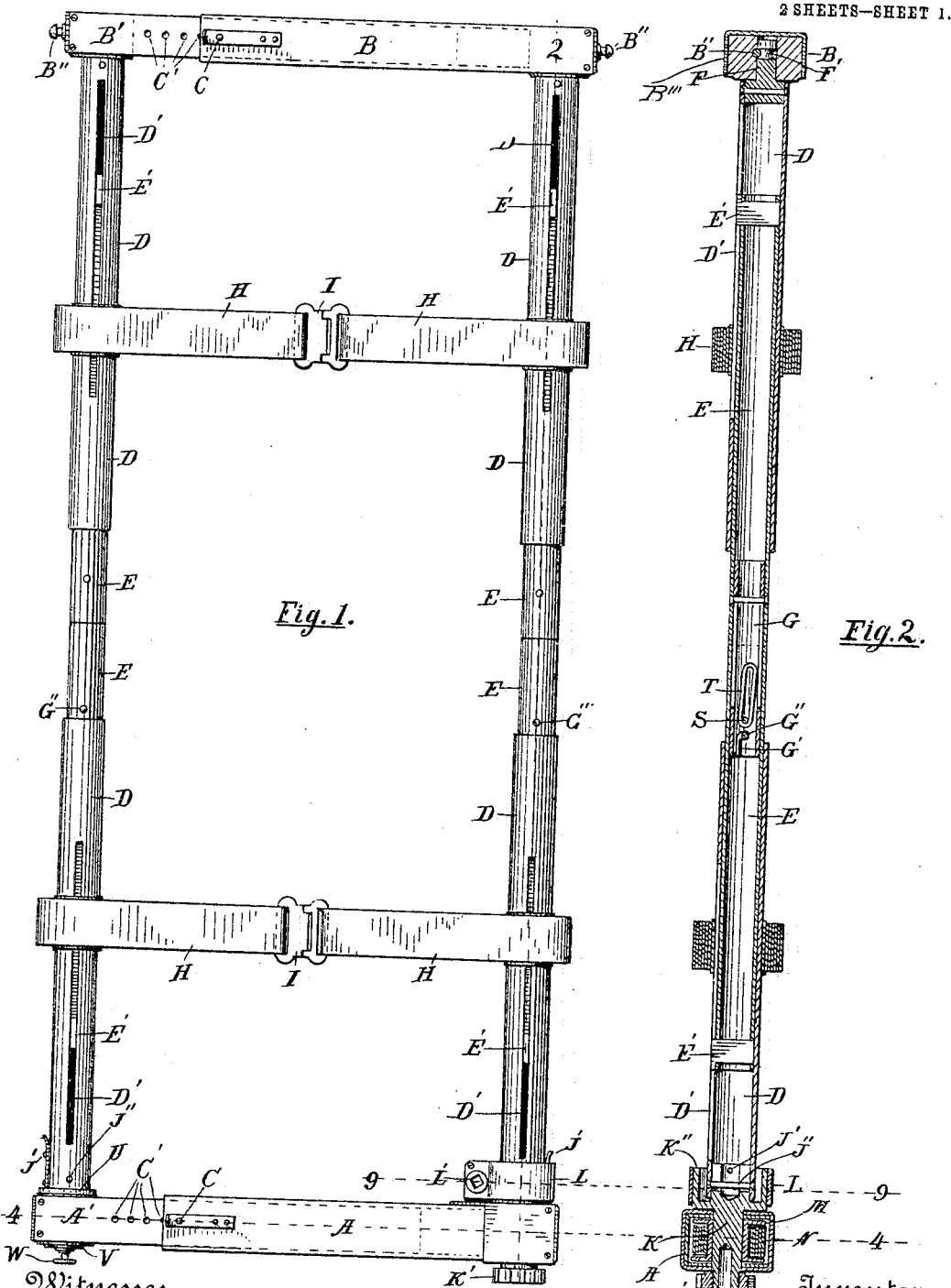

2 SHEETS—SHEET 2.

Witnesses
Edward R. Monroe
Georgiana Chace

Inventor
Willis O. Canouts
By Luther V. Moulton
Attorney

No. 782,189.

Patented February 7, 1905.

UNITED STATES PATENT OFFICE.

WILLIS O. CANOUTS, OF CRYSTAL, MICHIGAN, ASSIGNOR OF ONE-HALF TO DURFEE EMBALMING FLUID COMPANY, OF GRAND RAPIDS, MICHIGAN, A CORPORATION OF MICHIGAN.

BURIAL APPARATUS.

SPECIFICATION forming part of Letters Patent No. 782,189, dated February 7, 1905.

Application filed February 23, 1904. Serial No. 194,973.

*To all whom it may concern:*

Be it known that I, WILLIS O. CANOUTS, a citizen of the United States, residing at Crystal, in the county of Montcalm and State of Michigan, have invented certain new and useful Improvements in Burial Apparatus; and I do hereby declare the following to be a full, clear, and exact description of the invention, such as will enable others skilled in the art to which it appertains to make and use the same.

My invention relates to improvements in burial apparatus; and its object is to provide a device adjustable to various dimensions, that can be taken apart and packed compactly in a case, that is light and strong, that is of cheap and durable construction, and to provide the same with various new and useful features hereinafter more fully described, and particularly pointed out in the claims.

My device consists, essentially, of the combination and arrangement of longitudinally-extensible telescopic tubes coupled together and mounted in end frames, also made telescopic and adjustable, improved brake mechanism, means for connecting the respective tubes to rotate the same simultaneously, automatic means for releasing the straps from the casket, and in the various features of construction and arrangement, as will more fully appear by reference to the accompanying drawings, in which—

Figure 3:
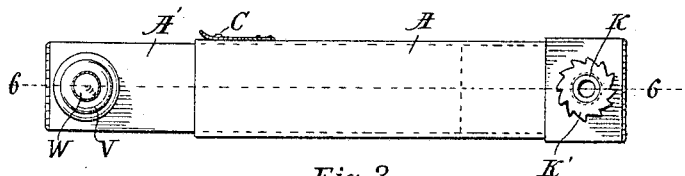
Figure 9:
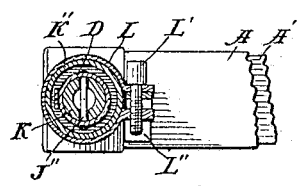
Figure 4:
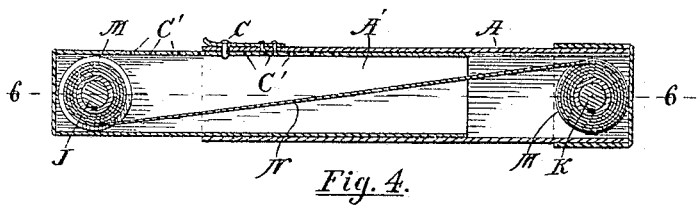
Figures 10, 11:
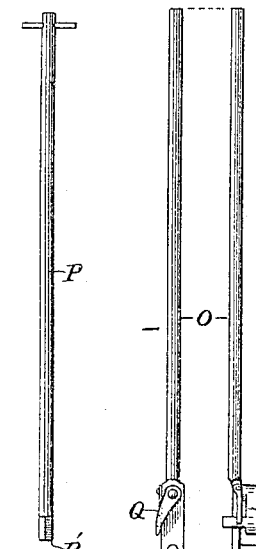
Figure 5:
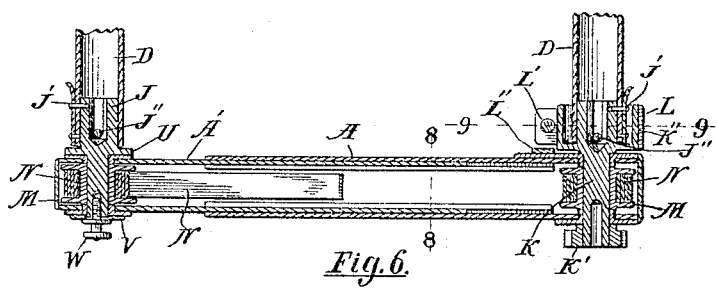
Figure 6:
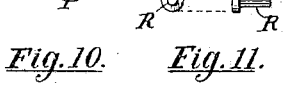
Figure 12:
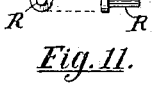
Figure 7:
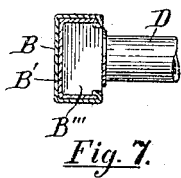
Figure 8:
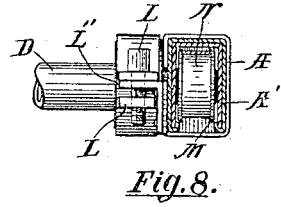

Figure 1 is a plan view of a device embodying my invention; Fig. 2, a vertical section of the same on the line 2 2 of Fig. 1; Fig. 3, an end elevation of the same; Fig. 4, a vertical section on the line 4 4 of Figs. 1 and 2; Fig. 5, an elevation of the inner side of one end; Fig. 6, a horizontal section on the line 6 6 of Figs. 3 and 4; Fig. 7, a transverse section on the line 7 7 of Fig. 5; Fig. 8, the same on the line 8 8 of Fig. 6; Fig. 9, a sectional detail on the line 9 9 of Figs. 1, 2, and 6; Fig. 10, a detail of the brake-key; Fig. 11, a detail of the winding-lever, and Fig. 12 a detail of the automatically-detachable hooks.

Like letters refer to like parts in all of the figures.

A A' and B B' represent the respective ends of the frame, which for strength and lightness are made, preferably, of sheet metal and rectangular in cross-section, the outer portion having its edges folded over the edges of the inner portion to form ways for the inner portion, which is slidable within the outer portion to extend the width of the frame as occasion may require. The inner portion of each end of the frame is provided with a series of openings C' and the outer portion with a locking-pin C to engage said openings and retain the frame in adjusted position. The sides of the frame are journaled in the ends and consist of telescopic tubes upon which are wound the straps H, which straps are connected at their adjacent ends by detachable fastenings I and adapted to the purpose of lowering the casket. Each of these sides of the frames consists of two tubes D D, each tube having a longitudinal slot D'. Slidable within the tubes D are tubes E, adapted to project more or less from the tubes D and provided with keys E', engaging the slots D', to prevent rotation of the tubes E within the tubes D. The adjacent ends of the tubes E are detachably coupled to each other and held in alinement by means of an inner section G, extending within the adjacent ends of the tubes E and having bayonet-slots G' to engage a transverse pin G'' in one of the tubes E. To facilitate the withdrawal of the tubes E from the tube D, a link T is provided within the section G and secured therein by a pin S. This link will traverse said pin, and thus move out of the way of the pin G'' when the tubes E are coupled, and will project from the end of the section G to afford a suitable means for withdrawing the tube E from the tube D as occasion requires.

F is a journal-bearing adapted to be inserted in an opening in a suitable block B''' in the end of the frame B B' and is detachably retained therein by means of a suitable pin B'', partially within said opening and engaging a groove F' in the bearing F.

The straps H for lowering the casket are connected at their adjacent ends by suitable detachable hooks and eyes I, and each hook is provided with an oppositely-inclined end extension I', so that when these fastenings drop loosely upon the bottom of the box the eye I'' will fall opposite this inclined end, and thus be readily detached from the hook. To bring the hook and eye in substantially the same plane, the eye is offset downward, as shown, about the thickness of the plate of which it is made. To adapt the hooks to the limited space below the casket when lowered and to avoid projecting parts to catch on the drapery of a casket, these hooks and eyes are made of sheet metal and stamped into the required shape.

To support the sides of the frame and to connect them to the end A A' of the frame, short shafts J and K are journaled in said end, and each shaft is provided with a projecting end to fit within the end of the tube E and provided with a transverse slot, as shown in Figs. 2, 6, and 9, and the tube is provided with a transverse pin J'' to engage said slot and prevent the tube from turning on the shaft, and to secure the tube in place a pin J' is provided, which is attached to a spring on the side of the tube and projects through the tube and within an opening in the side of the shaft. To connect the tubes at each side and cause them to unwind the straps H simultaneously, each shaft J and K is provided with a suitable drum M, and on the respective drums is oppositely wound a suitable strap or tape N, whereby the tendency of the tubes to turn toward each other at their upper side is limited by the unwinding of this strap from one drum and the winding of the same upon the other drum, so that the tubes turn simultaneously.

To regulate the lowering of the casket, a suitable friction-brake is provided upon the inner end of the shaft K, consisting of a suitable band L, preferably of flexible steel, surrounding and engaging a friction-pulley K'' on the inner end of the shaft K, said band L having one end attached to a bracket L'', fixed on the frame A, and the other end adjustable by means of a screw L', extending through the bracket and engaging a screw-threaded opening in the movable end of the strap. This screw is also provided with a suitable socket in which is inserted a key P (shown in Fig. 10) and having a squared end for adjusting the screw to adjust the friction of the brake and regulate the lowering of the casket. The outer end of the shaft K is provided with a central opening and a ratchet-wheel K', and a suitable lever O is provided with a pin R to enter the opening in the shaft and rotate therein and a spring-pawl Q to engage the ratchet, whereby the shaft may be rotated to wind up the straps H and N as occasion may require.

U is a friction-flange on the shaft J. V is a washer opposite the flange U, and W a thumb-screw extending through the washer and into the shaft J, whereby the friction of the flange will resist the turning of the shaft J, and thus take up and hold the slack of the strap N as occasion may require. This screw is preferably a left-hand screw, so that it will be automatically released when the straps H are unwound.

The casket supported on the straps H tends to turn the tubes D toward each other at their upper side. The brake retards the tube to which it is directly attached to turn slowly, and the strap N serves to hold the opposite tube D to turn at the same rate as the strap N unwinds from the drum on the shaft K and winds upon the drum of the shaft J. When the projection I' on the hook I strikes the bottom of the box in which the casket is deposited, the slack of the straps H will permit the eye I'' to drop down opposite the inclined end I' of the hook. The hook and eye will then be readily detached by pulling on the straps H, and thus the straps will be released from the casket. To adjust the device to a different size of casket, it is only necessary to slide the tubes E within the tubes D to change the length, which change will also adjust the respective pairs of straps H at greater or less distance from each other, and to adjust the device for width the pins C are withdrawn from the opening C', and the ends of the frame can then be extended or reduced by sliding one part of the same within the other.

When out of use, the device can be taken apart and packed within a box of about the length of one of the tubes D. The device is readily taken apart and reassembled. The entire structure being of tubes and sheet metal in tubular form, it is very strong and light, which is of great advantage in the matter of packing and transportation.

Having thus fully described my invention, what I claim, and desire to secure by Letters Patent, is—

1. In a burial apparatus, a frame comprising sheet-metal end portions rectangular in cross-section and having two parts, the edges of one part being folded over the edges of the other part, means for holding the same in adjustment, and longitudinally-adjustable side portions journaled in the end portions.

2. In a burial apparatus, a frame comprising rectangular end portions, outer tubular side portions journaled in the end portions and having longitudinal slots, inner extensions slidable in the outer side portions, and keys in the extensions and engaging and traversing the slots.

3. In a burial apparatus, a frame comprising end portions having openings, side portions having journals detachably inserted in said openings, and provided with grooves, and movable pins partially within said openings and engaging said grooves.

4. In a burial apparatus, a frame comprising an end portion having openings, tubular side portions, journal-bearings on one end of the side portions and inserted in the said openings and also provided with grooves, pins engaging said grooves, a second end portion, shafts journaled in the same, and detachably inserted in the other ends of the side portions, and spring-retained pins inserted in lateral openings in said shafts.

5. In a burial apparatus, a frame comprising end portions, tubular side portions journaled in one of the end portions at one end, shafts journaled in the other end portion and inserted in the other ends of the side portions and also having transverse slots and lateral openings, transverse pins in the side portions and engaging the slots and spring-retained pins engaging the lateral openings.

6. In a burial apparatus, a frame comprising an extensible end portion having openings near its ends, tubular side portions journaled in said openings and having longitudinal slots, inner tubes slidable in the side portions, keys in the inner tubes and engaging the slots, a second extensible end portion, shafts journaled in the same, tubular side portions attached to the shafts at one end and attached to the said inner tube at the other end.

7. In a burial apparatus, an extensible side to the frame comprising two outer tubes having longitudinal slots, two inner tubes slidable in the outer tubes, keys in the inner tubes and traversing the slots, and means for attaching the inner tubes to each other.

8. In a burial apparatus, an extensible side to the frame comprising two outer tubes having longitudinal slots, means for connecting the outer ends of the said tubes with the ends of the frame, inner tubes slidable in the outer tubes and projecting therefrom, keys in the inner tubes and engaging the slots, a connecting member attached to one of the inner tubes and inserted in the other inner tube and provided with a bayonet-slot, and a transverse pin in the inner tube and engaging the bayonet-slot.

9. In a burial apparatus, an extension side to the frame consisting of two outer tubes, two inner tubes slidable and non-rotative therein, a coupling-tube attached to one of the inner tubes and adapted to be inserted in the other inner tube, a link in the coupling-tube and a transverse pin within the link.

10. In a burial apparatus, a frame comprising longitudinally-adjustable ends, longitudinally-adjustable sides journaled in said ends, straps wound on the respective sides and detachably connected to each other, a brake to control one of said sides, a drum connected to each side, and a strap wound oppositely at its respective ends upon the respective drums.

11. The combination of two longitudinally-adjustable ends, outer tubes detachably journaled in one of said ends and having longitudinal slots, two shafts journaled in the other end, outer tubes detachably attached to the said shafts and having longitudinal slots, an inner tube slidable in each outer tube, keys in the inner tubes and traversing the slots, means for coupling the abutting ends of the inner tubes to each other, straps wound on the respective outer tubes and detachably connected to each other in pairs, a drum on each shaft, a tape wound oppositely on the respective drums, and a brake to control one of the shafts.

12. In a burial apparatus, a frame end, a shaft journaled in the frame end, a friction-surface on the shaft, an adjustable brake-band engaging the said surface, a second shaft journaled in the frame, rotative sides to the frame and attached to the respective shafts, straps wound on the sides and detachably connected to each other, and a strap wound oppositely on the respective shafts at its respective ends.

13. In a burial apparatus, a frame, an extensible end to the frame, a shaft journaled in the same, a friction-surface on the shaft, an adjustable band engaging the said surface, a second shaft journaled in the said end, a friction-flange on the said shaft, means for forcing the flange against the frame, a drum on each shaft, a strap wound oppositely on the respective drums and means for attaching the respective sides of the frame to the respective shafts.

14. In a burial apparatus, a frame, a shaft journaled in the frame and having an axial opening, a friction-surface and a ratchet-wheel on the shaft, an adjustable band engaging said surface, a lever, a pin and pawl on the lever to engage said opening and ratchet, a second shaft journaled in the frame, a friction-flange on said second shaft and engaging the side of the frame, a screw in the end of the said second shaft, a drum on each shaft, and a strap wound oppositely on the respective drums at its respective ends.

15. In a burial apparatus, a knockdown and adjustable frame comprising telescopic and rectangular ends, one of the same having openings for journals and movable pins partially within said openings, shafts journaled in the other end and having attached a brake and means for simultaneous rotation of said shafts, telescopic sides to the frame consisting of four outer tubes having longitudinal slots, four inner tubes slidable in the outer tubes, keys in the inner tubes and traversing the slots, coupling members in two of the inner tubes and having bayonet-slots, pins in the other inner tubes and engaging said slots, journals on two of the outer tubes detachably inserted in said opening and having grooves engaged by said pins, and means for attaching the other two outer tubes to the said shafts.

16. In a burial apparatus, two sheet-metal and telescopic ends, openings and movable pins in one end, two shafts journaled in the other end and having transverse slots and side openings, a friction-surface on one shaft, a friction-flange on the other shaft, an adjustable band engaging the friction-surface, a screw opposite the friction-flange, a strap oppositely wound on the respective shafts, four outer tubes having longitudinal slots, straps wound on said tubes, means for detachably connecting the ends of the opposite straps, four inner tubes slidable in the outer tubes, keys in the inner tubes and traversing the slots, coupling members attached to two of the inner tubes, bayonet-slots in said members, pins in the other two inner tubes and engaging said slots, journals on the ends of the two outer tubes and having grooves engaged by said pins, transverse pins in the other outer tubes and engaging the transverse slots in the shafts, and spring-retained pins engaging the lateral openings in the shafts.

In testimony whereof I affix my signature in presence of two witnesses.

WILLIS O. CANOUTS.

Witnesses:
 LUTHER V. MOULTON,
 GEORGIANA CHACE.